Patented July 5, 1932

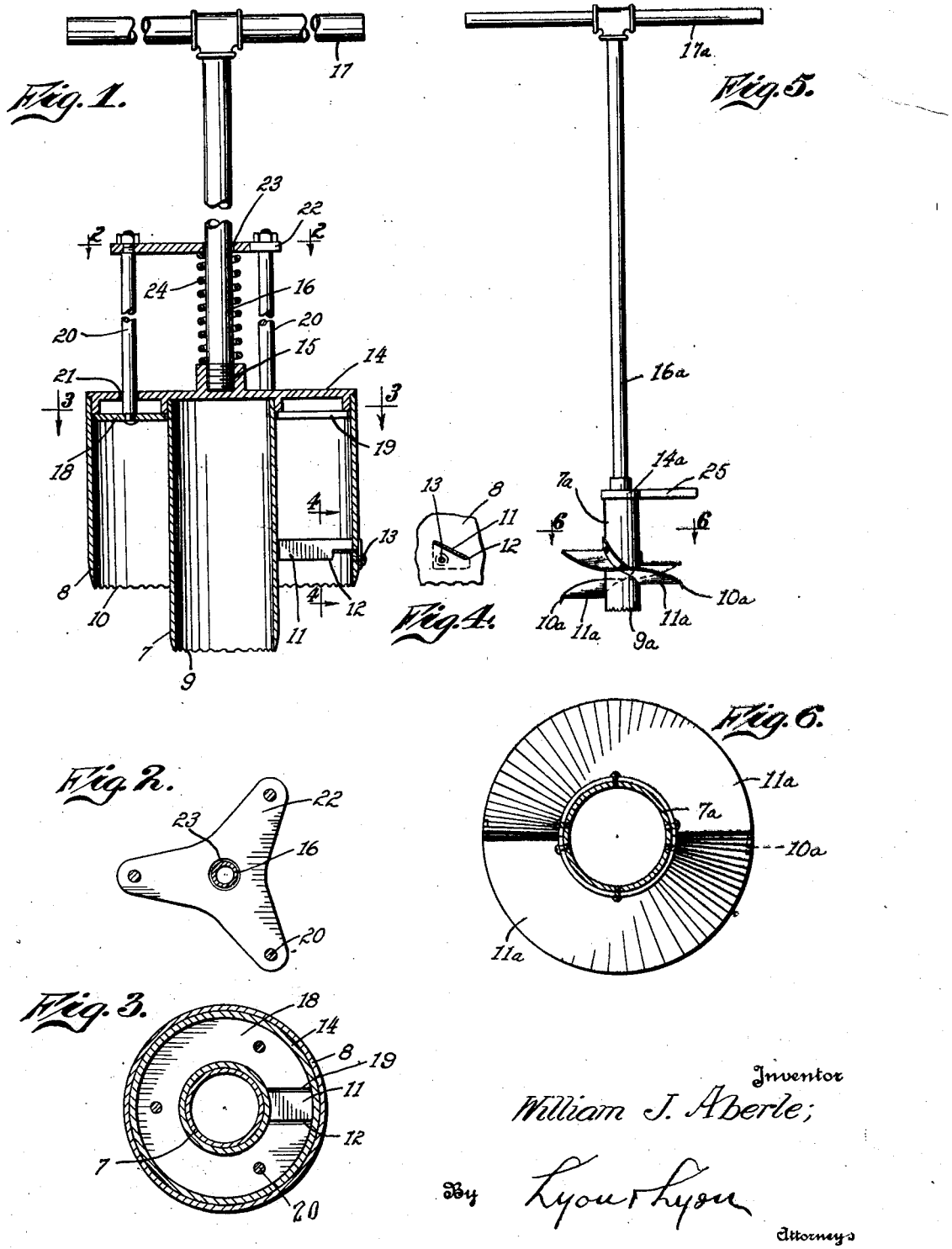

1,866,073

UNITED STATES PATENT OFFICE

WILLIAM J. ABERLE, OF PASADENA, CALIFORNIA

SOD-CUTTING TOOL

Application filed June 10, 1930. Serial No. 460,161.

This invention relates to sod-cutting tools of the character employed for cutting out a circular piece of sod.

Sprinkler systems for lawns are now largely used for irrigation of lawns. A sprinkler system of this character involves the use of sprinkler heads spaced at intervals in the lawn that is to be sprinkled, and the sprinkler heads are placed at a sufficiently low level so that when the lawn-mower is operating over the lawn the blades of the mower will not strike the sprinkler heads. If the grass grows too close to the sprinkler heads, even though it be cut short, it will soon grow to a height that interferes with the proper spread of water from the sprinkler heads, portions of the spray striking the blades of grass.

In order to avoid the difficulty mentioned above, it is customary to cut out a ring of sod around each sprinkler head and, because of the growth of the sod, it is, of course, necessary to quite frequently cut away the sod from around the sprinkler heads.

An object of this invention is to facilitate the operation of cutting away the sod as mentioned above.

Other objects are simplicity and inexpensiveness of construction.

Other objects and advantages will appear in the subjoined detailed description.

The accompanying drawing illustrates the invention:

Figure 1 is a broken view, mainly in vertical midsection, of a sod-cutting tool constructed in accordance with the provisions of this invention.

Figure 2 is a plan view, partly in section, from the line indicated by 2—2, Fig. 1. The cutters are omitted.

Fig. 3 is a reduced horizontal section on the line indicated by 3—3, Fig. 1.

Fig. 4 is a fragmental sectional elevation on the line indicated by 4—4, Fig. 1.

Fig. 5 is a side view of a modified form of sod-cutting tool embodying the invention.

Fig. 6 is a horizontal section on the line indicated by 6—6, Fig. 5.

First describing that form of the invention illustrated in Figs. 1 to 4, inclusive, there are provided concentric inner and outer cylindrical cutters 7 and 8, of which the cutting edges are indicated at 9 and 10, respectively. In this instance the edges 9, 10 are preferably serrated. Each of the cutters is a hollow cylinder, the diameter of the inner cutter being sufficiently great to easily surround a sprinkler head so as to make a circular cut around said head. The cutting edge 10, preferably, is at a higher level than the cutting edge 9, and the cutter 8 is of considerably larger diameter than the cutter 7 so as to effect the making of a circular cut in the sod at a little distance from the sprinkler head.

Connected with the outer cutter 8 and extending inwardly to the inner cutter 7 is a cutter blade 11 having an approximately horizontal cutting edge 12. In this instance, the blade 11 is secured to cutter 8 by any suitable means as, for example, by a screw or rivet 13. The blade 11, preferably, extends aslant upwardly from its forward edge and said blade is positioned so that the cutting edge 12 thereof is somewhat above the level of the cutting edge 10.

The upper ends of the cutters 7, 8 are connected together by a head 14, to which is secured, as by screwing it at 15 into said head, a shaft 16 to the upper end of which is secured a cross member 17 that constitutes a handle for operation of the tool.

The construction described above may be employed independently of the features now to be described. Within the cutter 8 is a plunger 18 of annular shape provided with a slot 19 of a size to permit of the plunger 18 passing the blade 11 when said plunger is moved to the lower end of the cutter 8.

An actuating means is provided for the plunger and, in this instance, said means includes rods 20 secured at their lower ends to the plunger 18 and operating through holes 21 in the head 14. The rods 20, in this instance, are three in number and are secured at their upper ends, in any suitable manner, to a cross-head 22 which is adapted to slide up and down on the shaft 16, said cross-head being provided with a hole 23 through which the shaft passes.

To normally maintain the plunger 18 in the upper end of the cutter 8, a coil spring 24 surrounds the shaft 16 between the head 14 and the cross-head 22.

The invention operates as follows: The operator, with the parts positioned as shown in Fig. 1, places the tool with the cutter 7 over a sprinkler head in a lawn and presses downwardly on the handle 17 to cause the cutter 8 to penetrate the sod. This produces two circular cuts, one immediately surrounding the sprinkler head and one a short distance from said sprinkler head. The operator then rotates the tool by means of the handle 17 so as to cause the blade 11 to make a horizontal cut in the sod to free the ring of sod from the earth. This horizontal cut may be made of any desired depth according to the amount of pressure brought to bear on the tool. The cut may be made by rotating the tool once or the tool may be rotated a number of times in order to cut the sod to the desired depth.

After the sod has been cut away, the tool will be raised and placed over another sprinkler head and the foregoing described operations repeated. In event of the sod or dirt sticking within the cutter 8, it may be expelled as, for example, by the operator placing his foot on the cross-head 22 and depressing it, thus causing the plunger 18 to descend to the cutting edge 10, thereby expelling any material that may not have readily freed itself from the cutter 8, and periphery of the cutter 7, when the tool was raised from the earth after cutting away the sod from around the sprinkler head.

Now describing the form of the invention illustrated in Figs. 5 and 6, the elements that functionally correspond to those described above in connection with Figs. 1 to 4, are indicated by the same reference characters with the addition of the suffix *a*. In this instance, there are two cutter blades 11a, said cutter blades being at different levels so that when the tool is rotated, the lower blade will make the cut at one level and the upper blade at a higher level. In this instance, the blades 11a are secured in any suitable manner to and project laterally from the periphery of the cutter 7a. The cutters 11a are semi-circular, the rear end of the upper one extending over the forward edge of the lower one so that any cut material discharging from the upper blade will discharge onto the lower blade.

The outer edges of the cutters 11a are provided with downwardly projecting cutting edges 10a which are semi-circular so that they together make a circular cut when the tool is forced into the sod and turned. This modified form of the invention operates the same as described above for the preferred form and, when the tool is turned, the cutting edges 10a produce a circular cut while the blades 11a make a horizontal cut.

The head 14a, in this instance, may be provided with a laterally extending tread member 25 on which the operator's foot may be placed to force the cutter into the sod. The preferred form of the tool may also be forced into the sod by pressure of the operator's foot when the foot is placed on the head 14.

I claim:

1. A sod-cutting tool comprising an inner member having a downwardly directed cutting edge all portions of which are equally spaced from a common vertical axis, an outer member attached to said inner member and having a downwardly directed cutting edge all portions of which are equally spaced from said vertical axis a greater distance than said first edge, sod ejecting means normally positioned between said members above said edges, means for forcing said ejecting means downwardly toward said edges and a handle attached to said inner and outer members for rotating said members about said vertical axis.

2. A sod-cutting tool comprising concentric hollow cylindrical cutting members, a blade between the cutting members secured to one of said cutting members and provided with a horizontal cutting edge, a head connecting the cutting members, a stem connected with the head and provided with a handle, an annular plunger between the cutting members, a cross-head shiftable along the stem, means connecting the cross-head with the plunger and passing through holes in the head, and a coil spring surrounding the stem between the head and the cross-head.

Signed at Los Angeles, California, this 4th day of June, 1930.

WILLIAM J. ABERLE.